(12) United States Patent
Nakano et al.

(10) Patent No.: US 6,186,053 B1
(45) Date of Patent: Feb. 13, 2001

(54) AUTOMATIC BREAD MAKER

(75) Inventors: Akihisa Nakano; Kouji Noda; Tosikatu Maeda, all of Hyogo (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/508,575

(22) PCT Filed: Jul. 14, 1998

(86) PCT No.: PCT/JP98/03159

§ 371 Date: May 17, 2000

§ 102(e) Date: May 17, 2000

(87) PCT Pub. No.: WO00/03601

PCT Pub. Date: Jan. 27, 2000

(51) Int. Cl.[7] .............. A21B 1/00; A21B 7/00; A21D 8/00; A47J 27/00; A47J 37/01
(52) U.S. Cl. .................. 99/327; 99/31; 99/348; 99/468; 366/98; 366/146; 366/314
(58) Field of Search ............ 99/325–333, 337, 99/338, 348, 352–355, 467, 468, 483, 484, 486; 366/69, 96–98, 144–147, 314, 601; 426/504, 512; 364/143, 146, 188, 477.01, 192, 400; 219/492, 494, 497

(56) References Cited

U.S. PATENT DOCUMENTS

| | | | | |
|---|---|---|---|---|
| 4,538,509 | * | 9/1985 | Ojima et al. | 99/352 X |
| 4,762,057 | * | 8/1988 | Hirota et al. | 99/329 R |
| 4,776,265 | * | 10/1988 | Ojima | 99/348 |
| 4,836,683 | * | 6/1989 | Aoyama | 366/98 |
| 4,844,048 | * | 7/1989 | Aruga et al. | 99/348 |
| 4,903,587 | * | 2/1990 | Nagasaka et al. | 99/325 |
| 4,930,899 | * | 6/1990 | Aoyama | 366/98 |
| 4,951,559 | * | 8/1990 | Arau et al. | 366/146 X |
| 4,957,040 | * | 9/1990 | Nakakura et al. | 99/331 |
| 4,984,512 | * | 1/1991 | Takahashi et al. | 99/327 |
| 5,019,972 | * | 5/1991 | Rim | 364/400 |
| 5,628,240 | * | 5/1997 | Yoshida | 99/326 |
| 5,722,314 | * | 3/1998 | Nakano et al. | 99/331 |

OTHER PUBLICATIONS

Patent Abstracts of Japan JP 09 271446 (Matsushita Electric Ind Co Ltd), Oct. 1997.*

* cited by examiner

Primary Examiner—Timothy F. Simone
(74) Attorney, Agent, or Firm—Pearne & Gordon LLP

(57) ABSTRACT

In an automatic bread maker, after the temperature of temperature control means (7) reaches a predetermined temperature, the rate of energization of a heater (2) is fixed by control means (14), and by doing so, bread, having a predetermined baking color, can be stably prepared.

8 Claims, 10 Drawing Sheets

AUTOMATIC BREAD MAKER

TECHNICAL FIELD

This invention relates to an automatic bread maker used in common homes.

BACKGROUND ART

A conventional automatic bread maker will now be described with reference to FIGS. 9 and 10. FIG. 9 is a block view showing the construction of main portions of the conventional automatic bread maker, and reference numeral 1 denotes a baking chamber, reference numeral 2 a heater constituting heating means, reference numeral 3 a bread baking vessel removably mounted within the baking chamber, reference numeral 4 a motor, reference numeral 5 a belt for transmitting the power of the motor 4, reference numeral 6 a kneading blade driven by the motor 4, reference numeral 7 a temperature detection means abutted against an outer surface of the baking chamber 1 so as to detect the temperature of the bread baking vessel 3 for the purpose of a process judgment and a temperature control, reference numeral 8 a lid, reference numeral 9 a yeast charging port for charging yeast therethrough, reference numeral 10 a solenoid operatively connected to a valve of the yeast charging port 9 so as to drop the yeast, reference numeral 11 a control means which includes a microcomputer, and is responsive to a signal from the temperature detection means 7 for controlling the heater 2, the motor 4 and the solenoid 10 so as to bake the bread, reference numeral 12 a display portion for displaying the condition and time of the operation, and reference numeral 13 an operating portion for instructing a menu, a course and the initiation of the cooking (preparation).

When the operating portion 13 is operated to start the cooking, the control means 11 selects one of a plurality of bread-making processes in accordance with the temperature detected by the temperature detection means 7, and subsequently controls loads of the heater 2, the motor 4 and the solenoid 10 in accordance with the selected bread-making process, thereby effecting the bread-making operation.

FIG. 10 is a diagram showing, as one example, the detection temperature of the temperature detection means 7 and the rate of energization of the heater 2 in the baking step of the conventional automatic bread maker. When the baking step is started, the control means 11 causes the heater 2 to be continuously energized. When the temperature within the baking chamber 1 rises, and the temperature reaches 100° C., the control means 11 is responsive to the output of the temperature control means 7 to reduce the rate of energization of the heater 2 to 85%. Then, when the temperature reaches 150°, the control means 11 reduces the rate of energization of the heater 2 to 30%. Thereafter, in accordance with the output of the temperature detection means 7, a temperature feedback control is effected at the energization rate of 30% when the detected temperature is not less than 130° C., and at the energization rate of 65% when the detected temperature is less than 130° C., and the cooking is completed a predetermined time period (50 minutes) after the baking is started.

In such a conventional automatic bread maker, since the temperature detection means is abutted against the outer surface of the baking chamber, and is not in contact with the bread baking vessel, this temperature detection means can not accurately detect the temperature of the bread baking vessel, and therefore even if the temperature feedback control is effected during the baking in order to keep the temperature of the bread baking vessel constant, the temperature difference between the bread baking vessel and the temperature detection means is large because of the influence of the outside (ambient) temperature and overshoot, and if the time, at which a crest and a trough of a temperature ripple come, is shifted even slightly, the baking color is greatly varied, and there were occasions when though the baking color was set to a dark color, it became a light color, and in contrast, though the baking color was set to a light color, it became a dark color.

DISCLOSURE OF THE INVENTION

This invention seeks to overcome the above problems, and an object of the invention is to provide a bread maker in which even if the temperature difference between a temperature detection means and a bread baking vessel is large, bread, having a predetermined baking color, can be prepared.

The above object of the invention has been achieved by an automatic bread maker comprising a baking chamber having a heater, a bread baking vessel removably mounted within the baking chamber, temperature detection means for detecting a temperature within the baking chamber, and control means responsive to an output of the temperature detection means so as to control the heater and others, wherein after the temperature of the temperature control means rises to a predetermined temperature in a baking step, the rate of energization of the heating means fixed regardless of the temperature of the temperature detection means.

With this construction, the energization of the heating means is stabilized during the baking, and the bread, having a predetermined baking color, can be obtained.

According to a first aspect of the invention, there is provided an automatic bread maker comprising a baking chamber having a heater, a bread baking vessel removably mounted within the baking chamber, temperature detection means for detecting a temperature within the baking chamber, and control means responsive to an output of the temperature detection means so as to control the heater and others; CHARACTERIZED in that after the temperature of the temperature control means reaches a predetermined temperature in a baking step, the rate of energization of the heating means is kept constant. Therefore, a temperature ripple is small, and a predetermined baking color of the bread can be stably obtained.

In a second aspect of the invention, there is further provided timer means for measuring a rising temperature gradient of the temperature detection means at a temperature-rising stage of the baking step, and after the temperature of the temperature detection means reaches a predetermined temperature, the rate of energization of the heating means is determined in accordance with a time period measured by the timer means. Therefore, a predetermined baking color of the bread can be stably obtained regardless of a variation in room temperature and a variation in voltage.

In a third aspect of the invention, in accordance with a time period measured by the timer means, the control means determines the energization rate before the detection temperature reaches a predetermined temperature, and also determines the energization rate after the detection temperature reaches a predetermined temperature. Therefore, the temperature rise within the baking chamber can be suppressed, and besides the baking color of the bread can be stabilized.

In a fourth aspect of the invention, the control means determines a predetermined temperature in accordance with a time period measured by the timer means. Therefore, the baking color of the bread can be stabilized.

In a fifth aspect of the invention, the time measurement is effected by the timer means, and subsequently in accordance with a time period measured by the timer means, the control means determines a time period before the energization rate is changed, and the time period before the temperature reaches the peak temperature is determined in accordance with the measured time period, and therefore the baking color of the bread can be stabilized as in the above case.

In a sixth aspect of the invention, the rate of energization of the heating means after the detection temperature of the temperature detection means reaches a predetermined temperature is determined in accordance with an amount of change of the detection temperature with the lapse of a predetermined time. Therefore, a predetermined baking color of the bread can be stably obtained regardless of a variation in room temperature and a variation in voltage.

In a seventh aspect of the invention, there is provided baking color selection means for selecting a baking color of bread, and the control means determines the rate of energization of the heating means in accordance with the baking color selected by the baking color selection means. With this construction, a predetermined baking color can be stably obtained.

In an eighth aspect of the invention, there is provided volume selection means for selecting a volume of bread, and the control means determines the rate of energization of the heating means in accordance with the volume selected by the volume selection means. Even when the volume of the bread is small, a variation in heater power and a variation in power source voltage are absorbed in accordance with the selected volume, so that a predetermined baking color can be obtained.

BEST MODE FOR CARRYING OUT THE INVENTION

Figure 1:
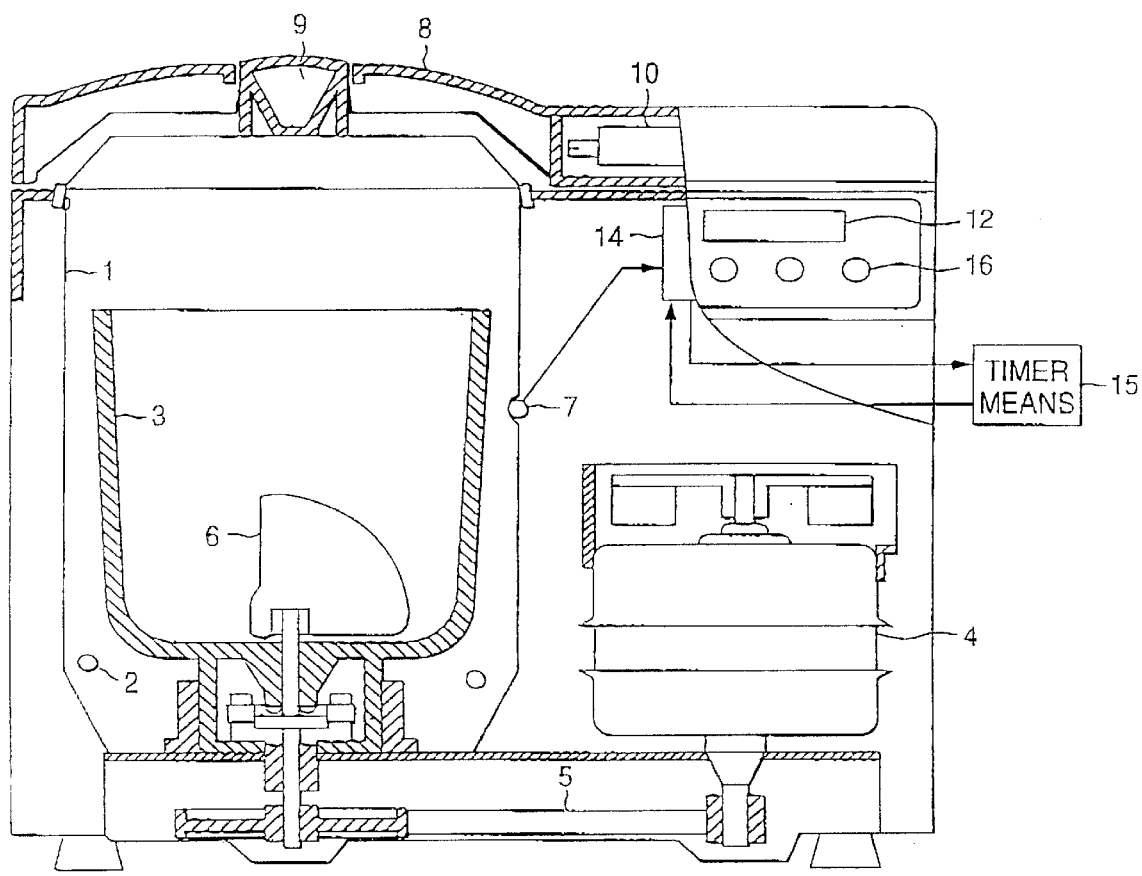
FIG. 1 is a block view showing main portions of one preferred embodiment of an automatic bread maker of the present invention.

One preferred embodiment of the present invention will now be described with reference to the drawings. FIG. 1 is a block view showing main portions of the first embodiment of the invention, and those portions identical to those of the conventional bread maker are designated by identical reference numerals, respectively. Control means 14 are responsive to signals from a temperature detection means 7 and a timer means 15 to control a heater 2, a motor 4 and a solenoid 10 so as to bake bread. The timer means 15 is responsive to a signal from the control means 14 to measure the time. An operating portion 16 includes a baking color selection means 17 and a volume selection means 18, and this operating portion 16 sets a menu, a course, the baking color and so on, and instructs the initiation of the cooking (preparation). When the initiation of the cooking is instructed by the operating portion 16, the control means 14 controls the heater, the motor and the solenoid while inputting the temperature, detected by the temperature detection means 7, thereinto, so as to effect a predetermined bread-making process. Here, the control means 14 and the timer means 15 are contained in a one-chip microcomputer. A display portion comprises a liquid crystal display device.

Figure 2:
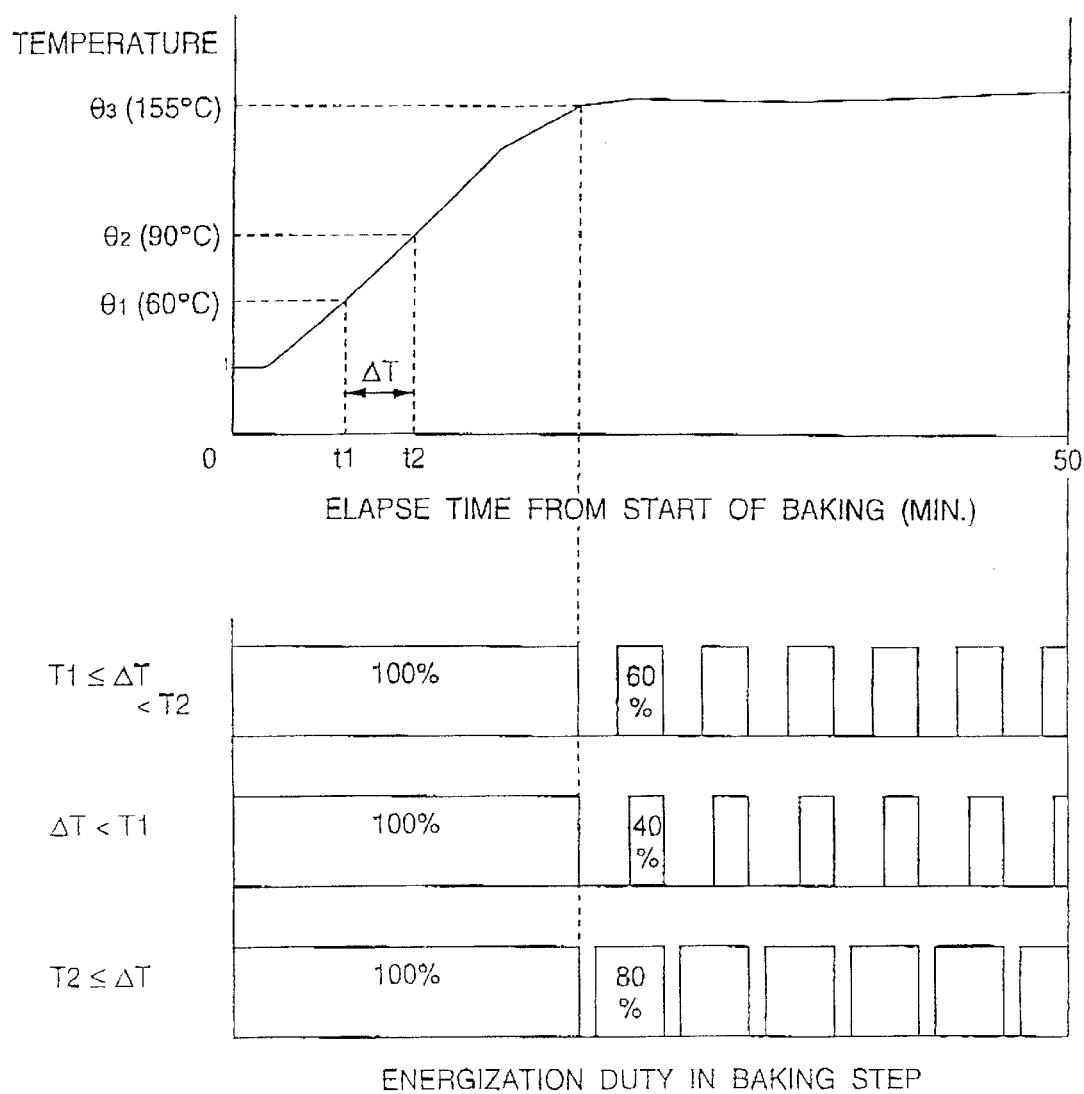
FIG. 2 is a graph showing a detection temperature and an energization rate in a baking step of the above embodiment of the invention.

FIG. 2 is a graph showing the relation between the elapse time from the start of the baking and the detection temperature detected by the temperature detection means during a baking step of the bread-making process (The abscissa axis represents the elapse time t from the start of the baking, and the ordinate axis represents the temperature $\theta$), and FIG. 2 also illustrates a diagram showing the rate of energization of the heater 2 at this time.

When the process shifts to the baking step, the control means 14 causes the heater 2 to be continuously energized. When the detection temperature of the temperature detection means 7 reaches a first predetermined temperature $\theta 1$ (60° C. in this embodiment), the timer means 15 starts the time measurement. Then, when the detection temperature of the temperature detection means 7 reaches a second predetermined temperature $\theta 2$ (90° C. in this embodiment), the timer means 15 stops the time measurement, and the time $\Delta T$, required for a temperature rise from $\theta 1$ to $\theta 2$, is obtained. The control means 14 further causes the heater 2 to be continuously energized, and when the detection temperature of the temperature detection means 7 reaches a third predetermined temperature $\theta 3$ (155° C. in this embodiment), the control means 14 causes the heater 2 to be energized at such an energization rate (60% in this embodiment) that the temperature of a bread baking vessel can be kept substantially constant if $\Delta T$ is not less than a first predetermined time T1 (120 seconds in this embodiment) and less than a second predetermined time T2 (180 seconds in this embodiment). At this time, a sequential feedback control by the temperature is not effected, and the heater is energized at the constant energization rate, determined regardless of the detection temperature, until the baking step is finished.

If $\Delta T$ is less than T1, the temperature is liable to rise because of variations in room temperature and power source voltage, and therefore if the energization rate after the peak temperature is 60%, the temperature gradually rises, and therefore the control means 14 reduces the rate of energization of the heater 2 (to 40% in this embodiment), thereby keeping the temperature of the bread baking vessel substantially constant.

In contrast, if $\Delta T$ is not less than T2, the temperature is less liable to rise, and therefore the rate of energization of the heater 2 is set to a lager value (80% in this embodiment).

Therefore, in the construction in which the bread baking vessel 3 is not in contact with the temperature detection means 7, even if the electric power of the heater fluctuates, and the power source voltage varies, the temperature of the bread baking vessel 3 after the third predetermined temperature θ3 can be kept substantially constant without being subjected to a large ripple, and the prepared bread can have a predetermined baking color.

The embodiment described here is directed to the second aspect of the invention, but if the influences of variations in room temperature and power source voltage are small, there can be used a method in which the measurement of ΔT is not effected, and the energization rate after the peak temperature is fixed to a constant value, and even with this method, the control can be effected more stably than the conventional feedback control, and this case is directed to the first aspect of the invention.

Figure 3:
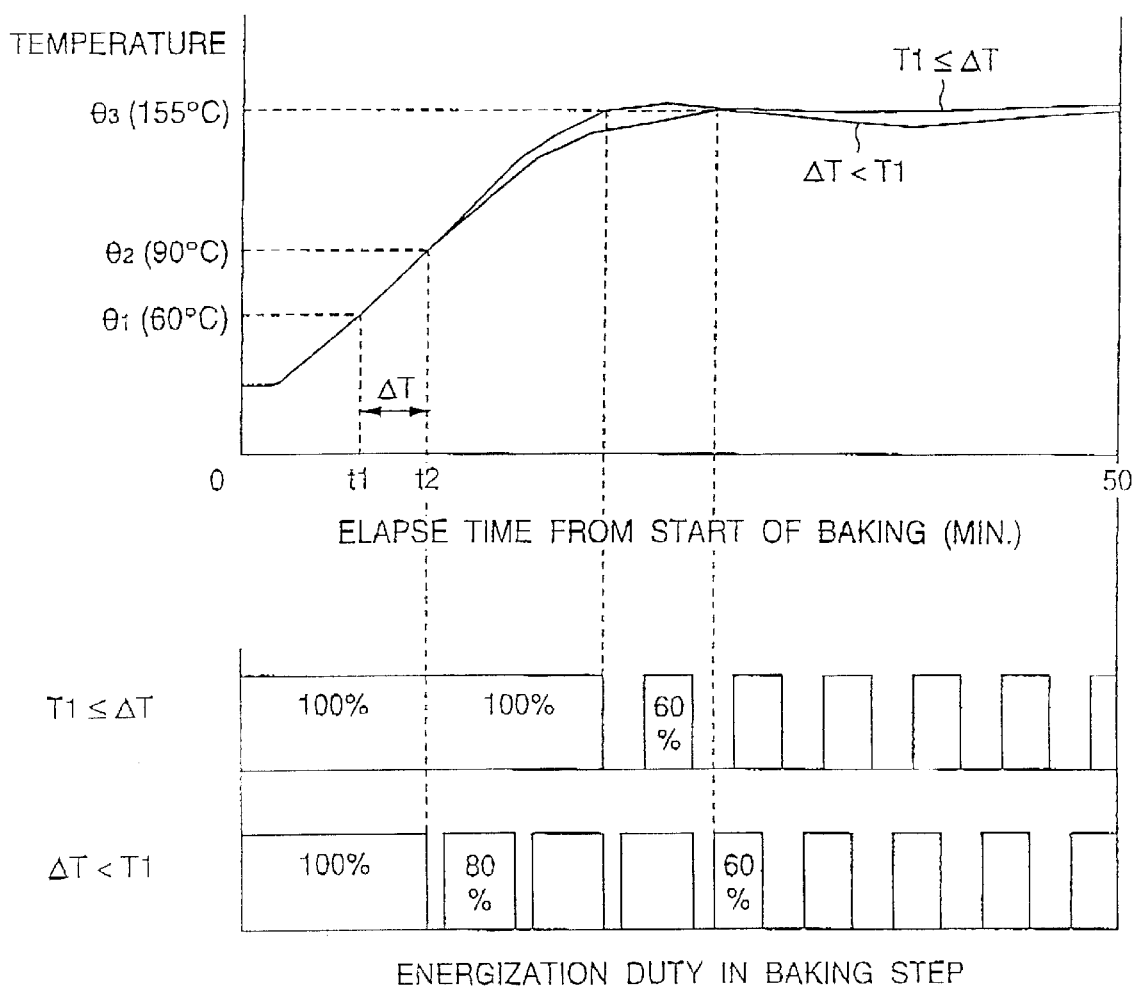
FIG. 3 is a graph showing a detection temperature and an energization rate in a baking step of another embodiment of the invention.

FIG. 3 is a graph explanatory of the third aspect of the invention, and more specifically shows a graph showing the relation between the elapse time from the start of the baking and the detection temperature of the temperature detection means 7, and FIG. 3 also illustrates a diagram showing the rate of energization of the heater 2 at this time. As in FIG. 2, the abscissa axis represents the elapse time t from the start of the baking, and the ordinate axis represents the temperature θ.

When the process shifts to the baking step, the control means 14 causes the heater 2 to be continuously energized (at an energization rate of 100%). When the detection temperature of the temperature detection means 7 reaches a first predetermined temperature θ1 (60° C. in this embodiment), the timer means starts the time measurement. Then, when the detection temperature of the temperature detection means 7 reaches a second predetermined temperature θ2 (90° C. in this embodiment), the timer means stops the time measurement, and the time ΔT, required for a temperature rise from θ1 to θ2, is obtained. At this time, when the detection temperature of the temperature detection means 7 exceeds θ2, the control means 14 reduces the energization rate (to 80% in this embodiment) if ΔT is less than a predetermined time T1 (120 seconds in this embodiment), and the control means 14 causes the heater 2 to be continuously energized if ΔT is not less than T1.

Then, when the detection temperature of the temperature detection means 7 exceeds a third predetermined temperature θ3, the control means 14 causes the heater 2 to be energized at such an energization rate (60% in this embodiment) after the third predetermined temperature (which rate is determined in accordance with ΔT) that the temperature of the bread baking vessel can be kept substantially constant even if there are variations in power source voltage and room temperature as in claim 2, and when a predetermined time (50 minutes in this embodiment) of the baking step elapses, the bread-making process is finished.

With this method, there can be prevented a situation in which because of a variation in electric power of the heater and a variation in power source voltage, the temperature within the baking chamber 1 is subjected to a large ripple by overshoot of the feedback control, and becomes different from the temperature of the temperature detection means, and unduly rises. Therefore, the prepared bread can have a predetermined color.

In this embodiment, although the heater 2 is continuously energized for the time period from the start of the baking to the time when the temperature reaches θ2, there may be used a method in which the heater 2 is energized at a constant energization rate for the time period from the start of the baking to the time when the temperature reaches θ2, and if ΔT is not less than a predetermined time T2, the energization rate is increased for the time period during which the temperature rises from θ2 to θ3.

Figure 4:
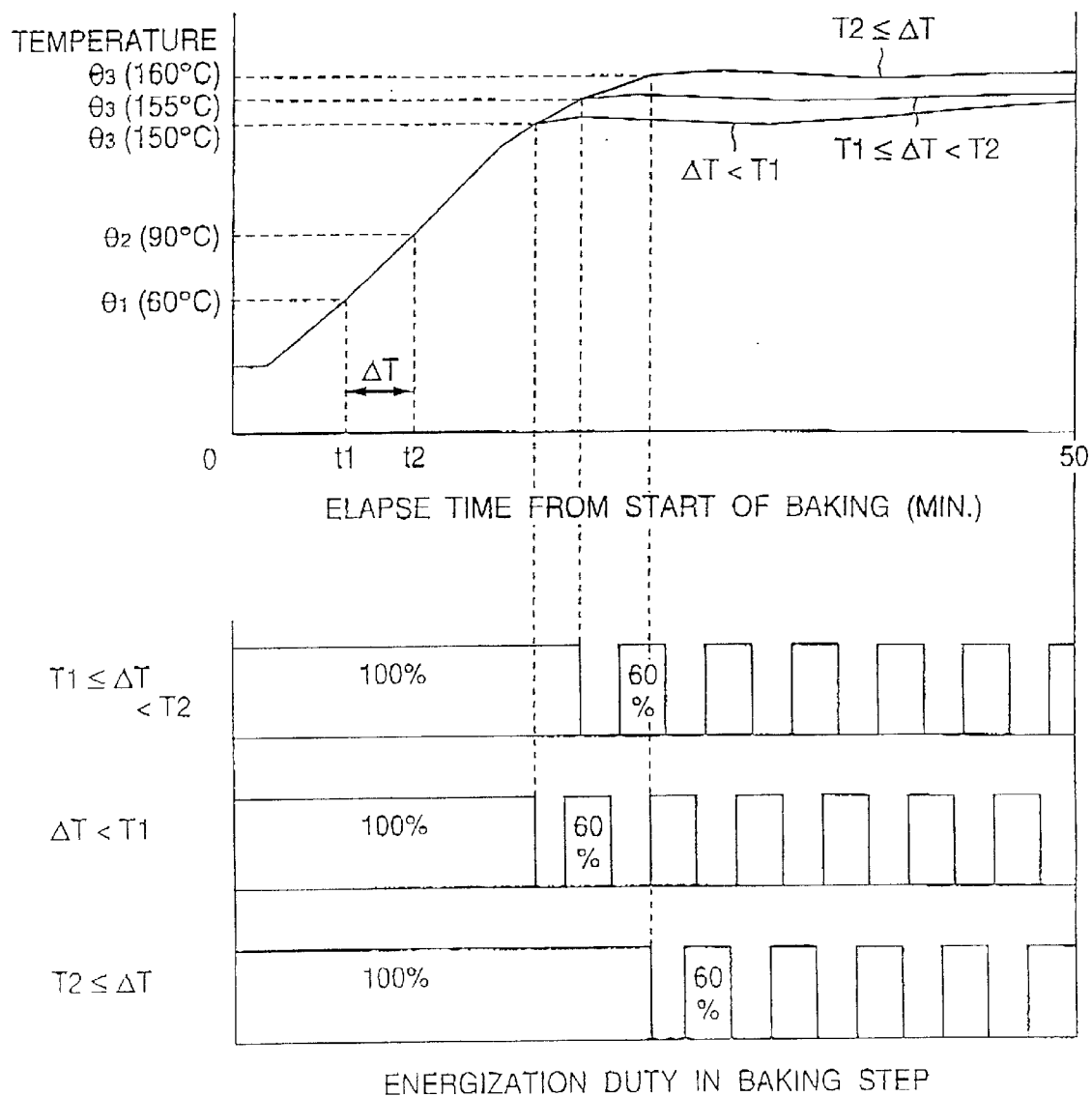
FIG. 4 is a graph showing a detection temperature and an energization rate in a baking step of a further embodiment of the invention.

FIG. 4 is a graph explanatory of the invention of claim 4, and more specifically shows a graph showing the relation between the elapse time from the start of the baking in a baking step and the detection temperature detected by the temperature detection means 7, and FIG. 4 also illustrates a diagram showing the rate of energization of the heater 2 at this time. The abscissa axis represents the elapse time t from the start of the baking, and the ordinate axis represents the temperature θ.

When the process shifts to the baking step, the control means 14 causes the heater 2 to be continuously energized. When the detection temperature of the temperature detection means 7 reaches a first predetermined temperature θ1 (60° C. in this embodiment), the timer means starts the time measurement. Then, when the detection temperature of the temperature detection means 7 reaches a second predetermined temperature θ2 (90° C. in this embodiment), the timer means stops the time measurement, and the time ΔT, required for a temperature rise from θ1 to θ2, is obtained. Then, the control means 14 causes the heater 2 to be continuously energized until the temperature reaches a third predetermined temperature θ3 (140° C. in this embodiment). If ΔT is not less than T1 and less than T2 (T1≦ΔT<T2), θ3=155° C. (no correction) is obtained, and if ΔT is less than T1 (ΔT<T1), θ3=150° C. (correction: −5° C.) is obtained, and if ΔT is not less than T2 (T2≦ΔT), θ3=160° C. (correction: +5° C.) is obtained. When the detection temperature reaches θ3, the control means 14 causes the heater 2 to be energized at such an energization rate that the temperature of the bread baking vessel can be kept constant, and when the time of the baking step becomes 50 minutes, the break-making process is finished.

With this method, the peak temperature can be corrected in accordance with the time of rise of the detection temperature, and the prepared bread can have a predetermined baking color.

Figure 5:
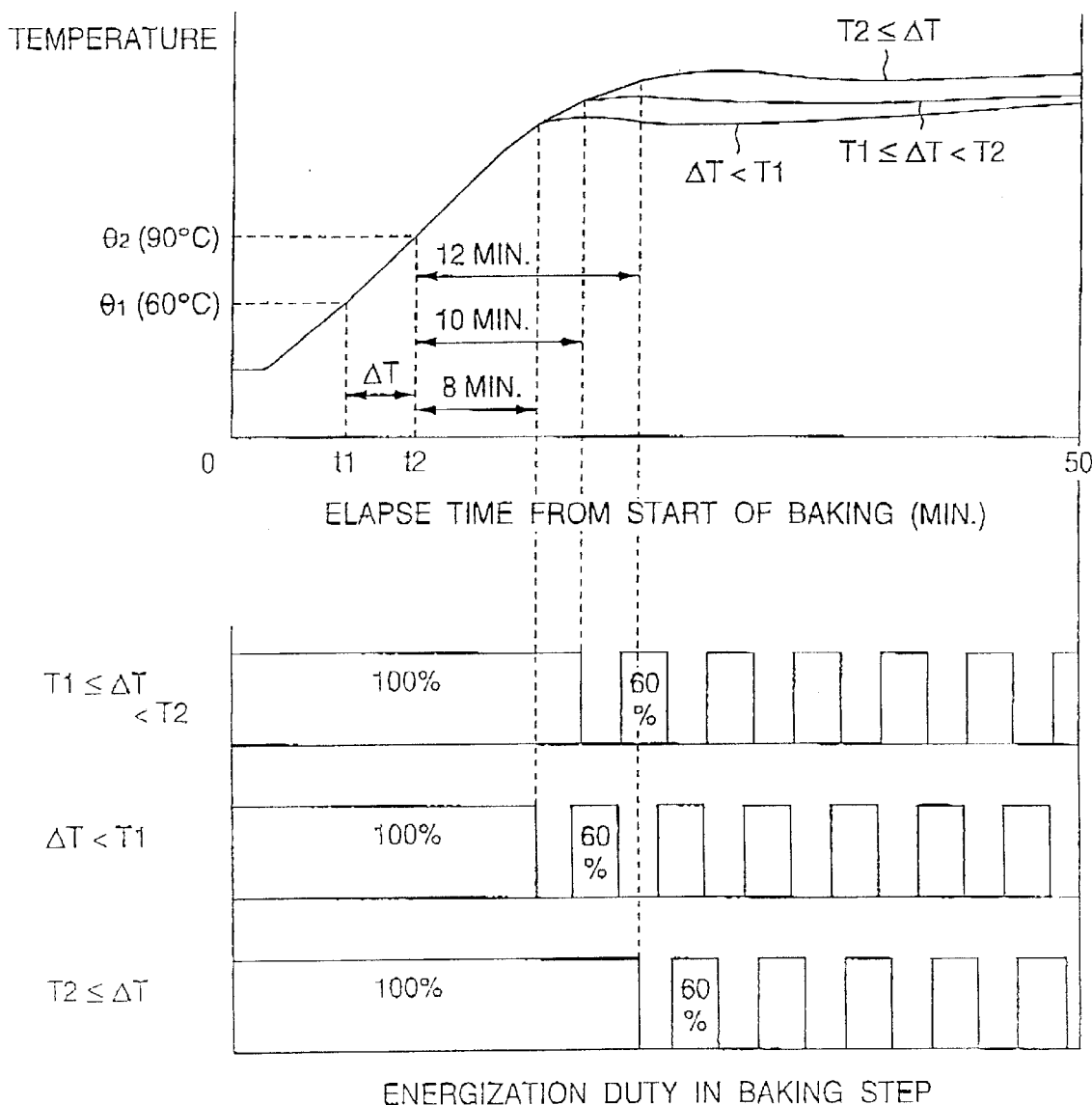
FIG. 5 is a graph showing a detection temperature and an energization rate in a baking step of a further embodiment of the invention.

FIG. 5 is a graph explanatory of the invention of claim 5, and more specifically shows a graph showing the relation between the elapse time from the start of the baking in a baking step and the detection temperature detected by the temperature detection means 7, and FIG. 5 also illustrates a diagram showing the rate of energization of the heater 2 at this time. The abscissa axis represents the elapse time t from the start of the baking, and the ordinate axis represents the temperature θ.

When the process shifts to the baking step, the control means 14 causes the heater 2 to be continuously energized. When the detection temperature of the temperature detection means 7 reaches a first predetermined temperature θ1 (60° C. in this embodiment), the timer means 15 starts the time measurement. Then, when the detection temperature of the temperature detection means 7 reaches a second predetermined temperature θ2 (90° C. in this embodiment), the timer means stops the time measurement, and the time ΔT, required for a temperature rise from θ1 to θ2, is obtained. When the detection temperature of the temperature measurement means 7 exceeds θ2, the control means 14 sets a continuous energization time to 10 minutes (standard time) if ΔT is not less than T1 (120 seconds in this embodiment) and less than T2 (180 seconds in this embodiment), and the control means 14 sets the continuous energization time to 8 minutes (correction: −2 minutes) if ΔT is less than the predetermined time T1, and the control means 14 sets the continuous energization time to 12 minutes (correction: +2 minutes) if ΔT is not less than T2. In this manner, the heater 2 is continuously energized under the control of the control means 14. After the lapse of the continuous energization time, the control means 14 causes the heater 2 to be energized at such an energization rate (60% in this embodiment) that the temperature of the bread baking vessel can be kept substantially constant, and when the time of the baking step becomes 50 minutes, the bread-making process is finished.

With this method, the time of the heating by the continuous energization can be corrected in accordance with the time of rise of the detection temperature, and the prepared bread can have a predetermined baking color.

Figure 6:
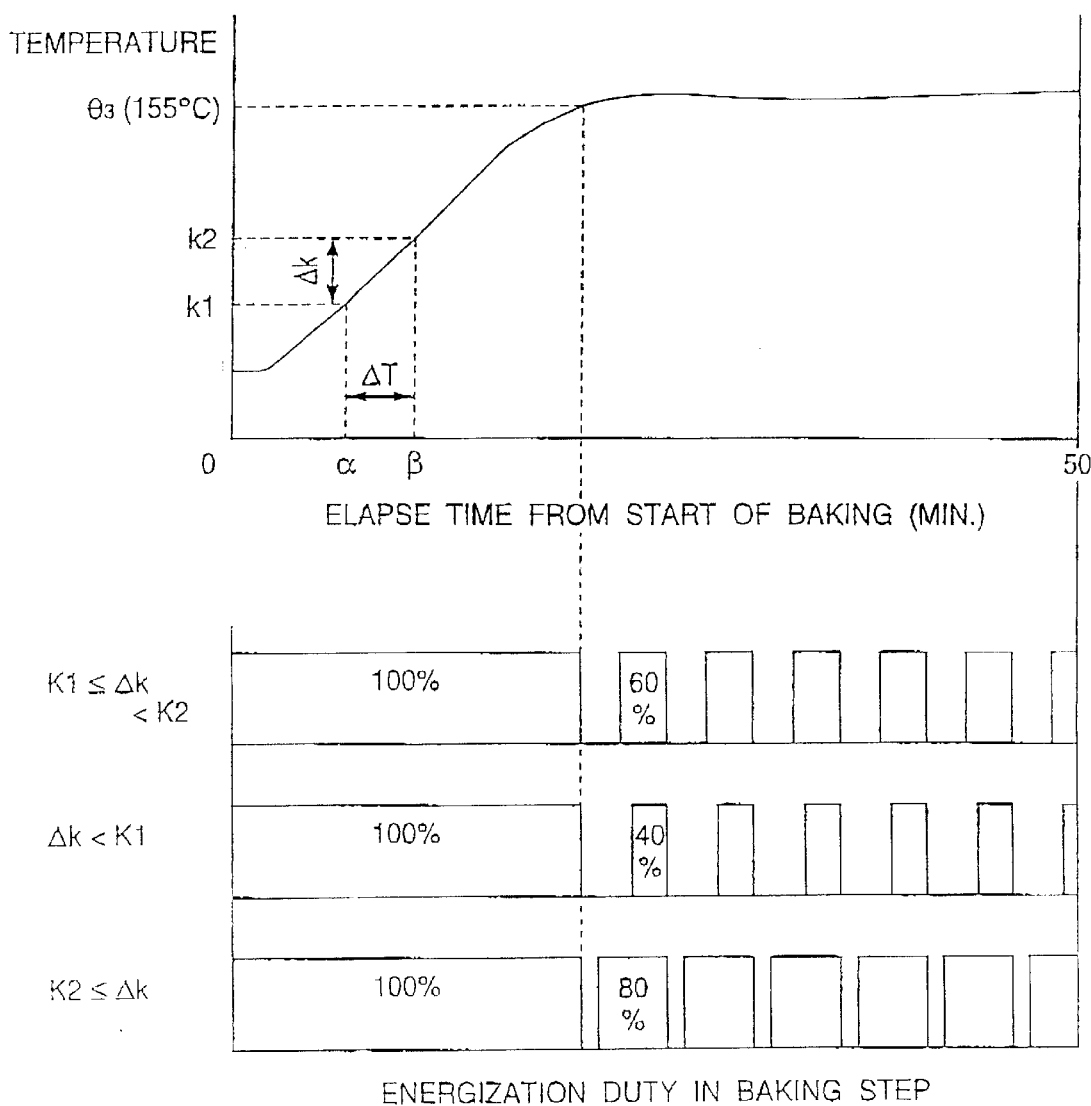
FIG. 6 is a graph showing a detection temperature and an energization rate in a baking step of a further embodiment of the invention.

FIG. 6 is a graph explanatory of the invention of claim 6, and more specifically shows a graph showing the relation between the elapse time from the start of the baking in a baking step and the detection temperature detected by the temperature detection means 7, and FIG. 6 also illustrates a diagram showing the rate of energization of the heater 2 at this time. The abscissa axis represents the elapse time t from the start of the baking, and the ordinate axis represents the temperature θ.

When the process shifts to the baking step, the control means 14 causes the heater 2 to be continuously energized. By the temperature detection means 7, a detection temperature k1 is obtained a predetermined time α (240 seconds in this embodiment) after the start of the baking step, and a detection temperature K2 is obtained a predetermined time β (400 seconds in this embodiment) after the start of the baking step, and the temperature difference Δ between the two is obtained. When the detection temperature of the temperature detection means 7 reaches a third predetermined temperature θ3 (155° C. in this embodiment), the control means 14 controls the heater 2 to such an energization rate (60% in this embodiment) (which is determined experimentally) that the temperature of the bread baking vessel can be kept constant if Δk is not less than a predetermined temperature difference K1 (25° C. in this embodiment) and less than a predetermined temperature difference K2 (35° C. in this embodiment). If Δk is less than K1, the control means 14 reduces the rate of energization of the heater 2 (to 40% in this embodiment) since the electric power is increased because of variations in heater power and power source voltage. If Δk is not less than K2, the control means 14 increases the rate of energization of the heater 2 (to 80% in this embodiment). The energization of the heater 2 is effected until a predetermined time (50 minutes) of the baking step elapses, and the bread-making process is finished.

With this method, even if the power of the heat fluctuates, and the power source voltage varies, the prepared bread can have a predetermined baking color.

Figure 7:
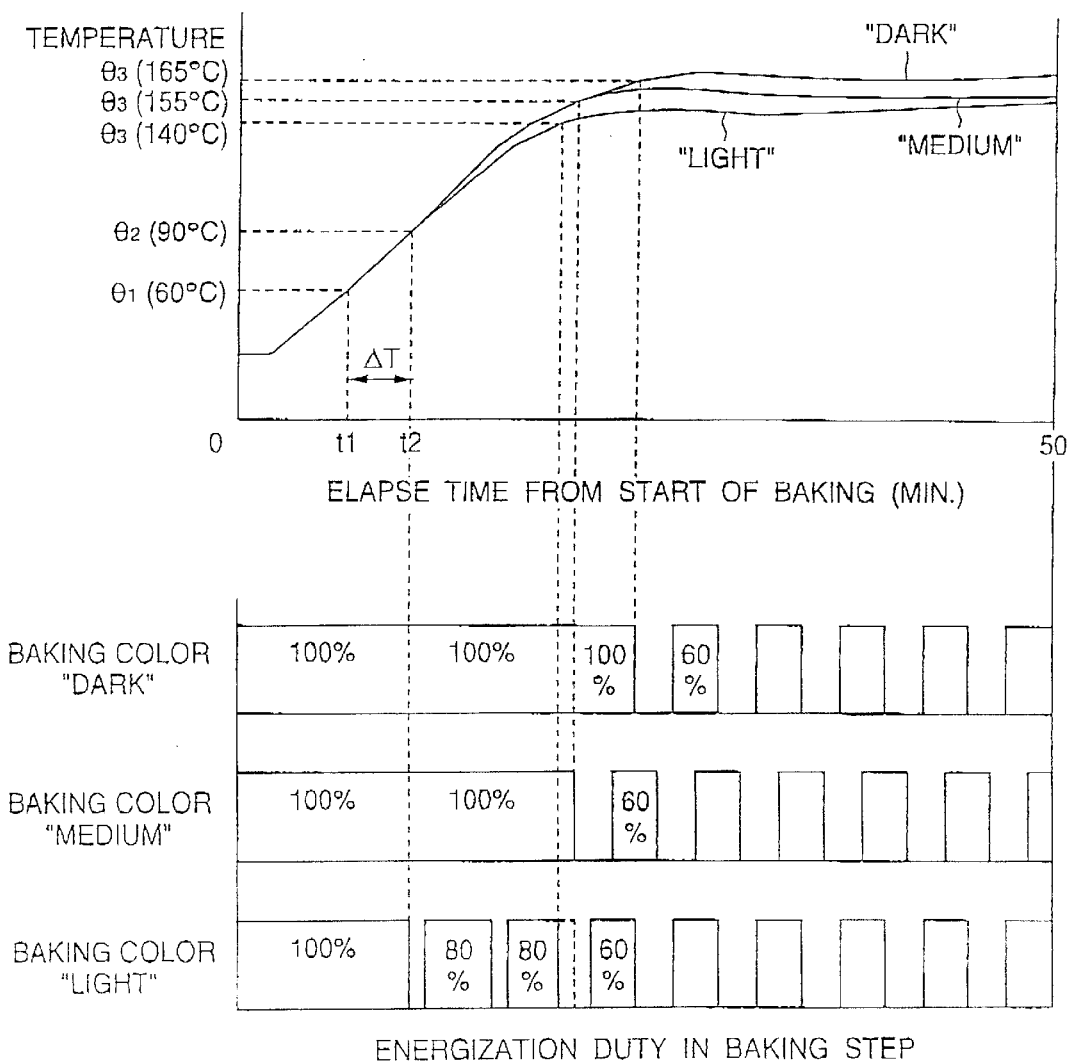
FIG. 7 is a graph showing a detection temperature and an energization rate in a baking step of a further embodiment of the invention.

FIG. 7 is a graph explanatory of the invention of claim 7, and more specifically shows a graph showing the relation between the elapse time from the start of the baking (in the baking step in which the baking color is selected by the baking color selection means 17) and the detection temperature detected by the temperature detection means 7, and FIG. 7 also illustrates a diagram showing the rate of energization of the heater 2 at this time. The abscissa axis represents the elapse time t from the start of the baking, and the ordinate axis represents the temperature θ.

When the process shifts to the baking step, the control means 14 causes the heater 2 to be continuously energized. When the detection temperature of the temperature detection means 7 reaches a first predetermined temperature θ1 (60° C. in this embodiment), the timer means 15 starts the time measurement. Then, when the detection temperature of the temperature detection means 7 reaches a second predetermined temperature θ2 (90° C. in this embodiment), the timer means stops the time measurement, and the time ΔT, required for a temperature rise from θ1 to θ2, is obtained. If the baking color, selected by the baking color selection means 17, is either of "dark" and "medium", the control means 14 causes the heater 2 to be continuously energized until the temperature reaches a third predetermined temperature θ3 (165° C. in the case of "dark", and 155° C. in the case of "medium"). If the selected baking color is "light", the control means 14 causes the heater 2 to be energized at the energization rate of 80% until the temperature reaches the predetermined third temperature θ3 (140° C. in the case of "light"). After the temperature reaches θ3, the heater is energized at such an energization rate that the temperature of the bread baking vessel can be kept constant, and the energization is continued until a predetermined time (50 minutes) of the baking step elapses, and the bread-making process is finished.

With this method, even when the light baking color is selected, the temperature difference between the detection temperature of the temperature detection means 7 and the temperature of the bread baking vessel can be made small, and the prepared bread can have a predetermined baking color corresponding to the selected baking color.

Figure 8:
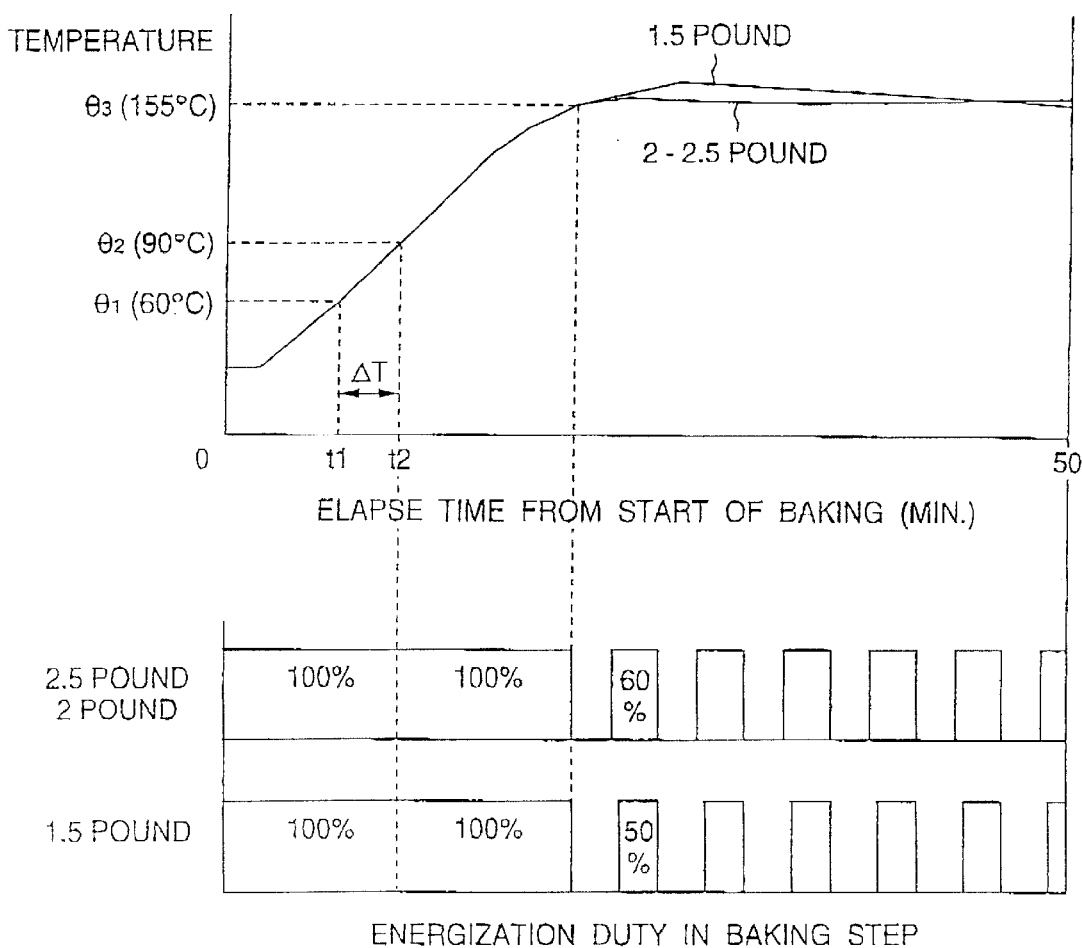
FIG. 8 is a graph showing a detection temperature and an energization rate in a baking step of a further embodiment of the invention.
Figure 9:
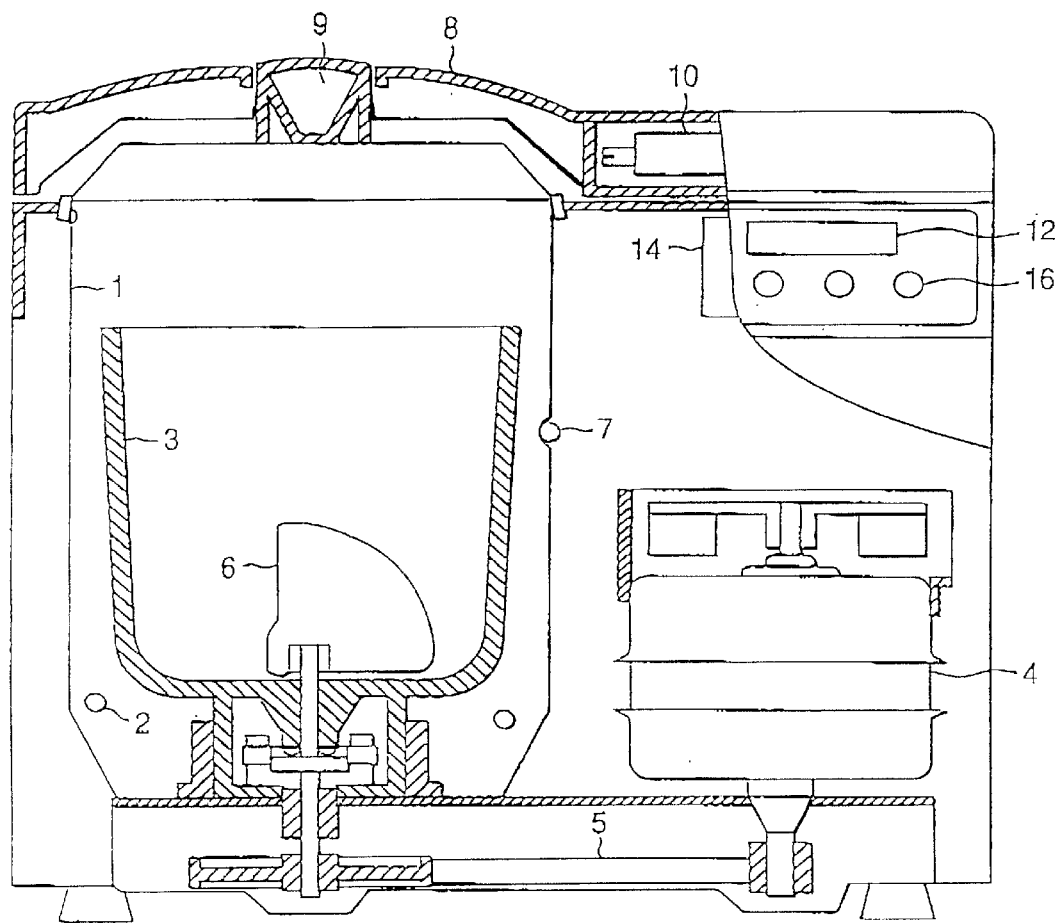
FIG. 9 is a block view showing main portions of a conventional automatic bread maker.
Figure 10:
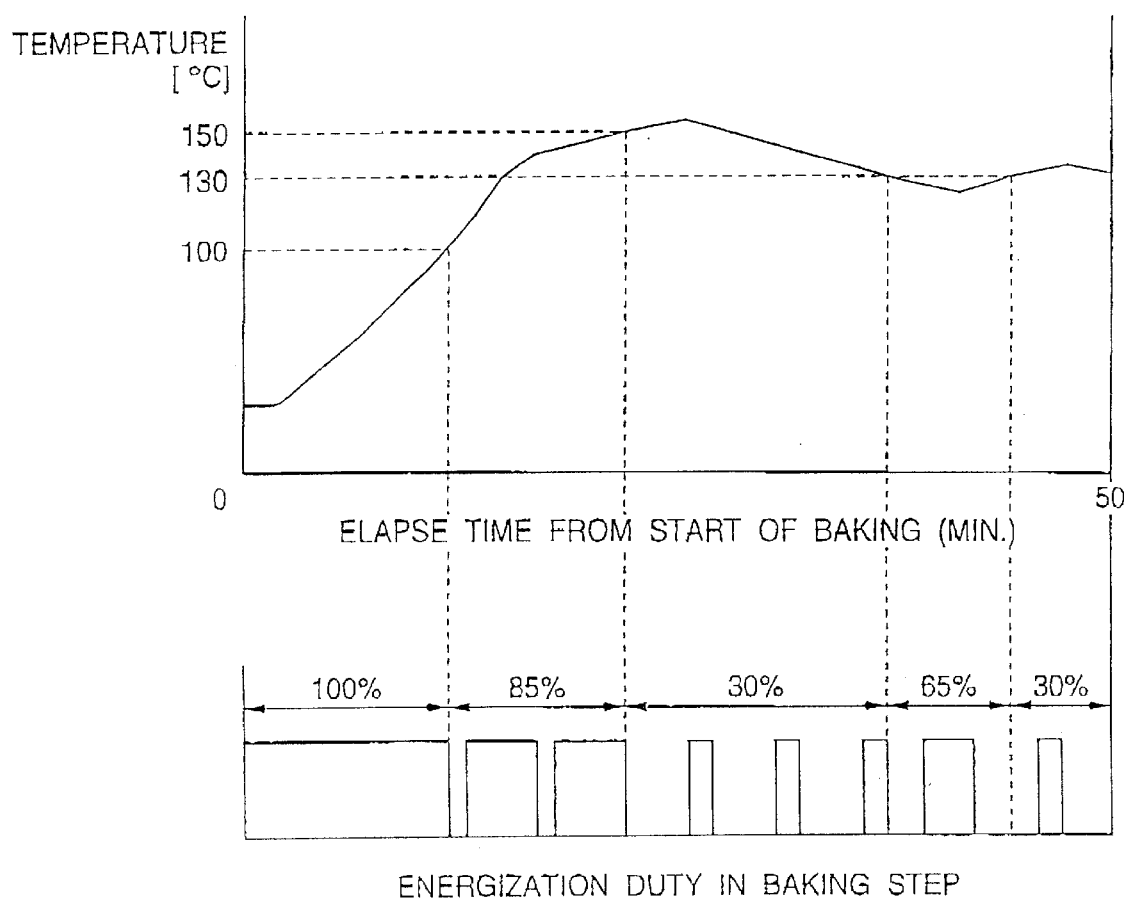
FIG. 10 is a graph showing a detection temperature and an energization rate in a baking step of the conventional bread maker.

FIG. 8 is a graph explanatory of the invention of claim 8, and more specifically shows a graph showing the relation between the elapse time from the start of the baking (in the baking step in which the volume is selected by the volume selection means 18) and the detection temperature detected by the temperature detection means 7, and FIG. 8 also illustrates a diagram showing the rate of energization of the heater 2 at this time. The abscissa axis represents the elapse time t from the start of baking, and the ordinate axis represents the temperature θ.

When the process shifts to the baking step, the control means 14 causes the heater 2 to be continuously energized. When the detection temperature of the temperature detection means 7 reaches a first predetermined temperature θ1 (60° C. in this embodiment), the timer means starts the time measurement. Then, when the detection temperature of the temperature detection means 7 reaches a second predetermined temperature θ2 (90° C. in this embodiment), the timer means stops the time measurement, and the time ΔT, required for a temperature rise from θ1 to θ2, is obtained. If either of "2.5 pound" and "2 pound" is selected by the volume selection means 18, the control means 14 causes the heater 2 to be energized at an energization rate of 60% after the detection temperature of the temperature detection means 7 reaches θ3, and if "1.5 pound" is selected by the volume selection means 18, the control means 14 causes he heater 2 to be energized at the energization rate of 50% after the temperature reaches θ3, and when a predetermined time (50 minutes) elapses from the start of the baking step, the bread-making process is finished.

With this method, the energization rate can be corrected in accordance with the selected bread volume, and the predetermined baking color can be obtained regardless of the volume.

These inventions of the claims can be used in combination with each other.

INDUSTRIAL APPLICABILITY

In the first aspect of the invention, even in the structure in which the ordinary feedback-type temperature control in the baking step, the temperature detection means is spaced from the bread baking vessel, and the temperature difference between the two is large, the temperature of the bread baking vessel can be kept substantially constant, and when selecting the baking color, the baking color can be stably set merely by setting the rate of energization of the heater to an appropriate value.

In the second aspect of the invention, the energization rate after the detection temperature reaches the predetermined temperature is changed in accordance with the time required for a temperature rise between the two temperature values in the baking step, the temperature within the baking chamber is prevented from become unstable even if the electric power of the heater fluctuates, and the room temperature varies, and the temperature of the bread baking vessel can be kept substantially constant regardless of the temperature of the temperature detection means, and the prepared bread can have a predetermined baking color.

In the third aspect of the invention, the energization rate before the detection temperature reaches the peak temperature is changed in accordance with the time required for a temperature rise between the two temperature values in the baking step, and by doing so, overshoot at a temperature near to the peak temperature is reduced, and even if the power of the heater fluctuates, and the power source voltage and the room temperature vary, the temperature of the bread baking vessel can be kept substantially constant regardless of the temperature of the temperature detection means, and the prepared bread can have a predetermined baking color.

In the fourth aspect of the invention, the peak temperature is changed in accordance with the time required for a temperature rise between the two temperature values in the baking step, and by doing so, overshoot is reduced without reducing the energizing power at a temperature near to the peak temperature, and even if the power of the heater fluctuates, and the power source voltage and the room temperature vary, the temperature of the bread baking vessel can be kept substantially constant regardless of the temperature of the temperature detection means, and the prepared bread can have a predetermined baking color.

In the fifth aspect of the invention, the time before the detection temperature reaches the peak temperature is changed in accordance with the time required for a temperature rise between the two temperature values in the baking step, and by doing so, even if the power of the heater, the power source voltage and the room temperature vary, the peak temperature can be so determined that overshoot can be reduced, and that the energizing power can be increased as much as possible, and the bread can be prepared more stably.

In the sixth aspect of the invention, the rate of energization of the heater after the detection temperature reaches the predetermined temperature is changed in accordance with the amount of rise of the detection temperature for the predetermined time period, and therefore even if the power of the heater fluctuates, and the power source voltage and the room temperature vary, the prepared bread can have a predetermined baking color as in the aspects 2 to 5 of the invention.

In the seventh aspect of the invention, the energization rate after the peak temperature is determined in accordance with the selected baking color, and therefore there will not be encountered a reverse phenomenon in which the baking color becomes darker when selecting "light" than when selecting "medium", and the prepared bread can have the selected baking color.

In the eighth aspect of the invention, the energization rate after the detection temperature reaches the peak temperature is changed in accordance with the selected volume, and therefore there will not be encountered a reverse phenomenon in which at the time of changing the volume, the baking color becomes darker when selecting "light" than when selecting "medium", and the baking color of the prepared bread can stably have the predetermined color regardless of the volume of the bread.

What is claimed is:

1. An automatic bread maker, comprising:
   a baking chamber having a heater;
   a bread baking vessel removably mounted within said baking chamber;
   temperature detection means for detecting a temperature within said baking chamber; and
   control means responsive to an output of said temperature detection means so as to control said heater and others;
   wherein after the temperature of said temperature control means reaches a predetermined temperature in a baking step, the rate of energization of said heating means is kept constant.

2. An automatic bread maker according to claim 1, further comprising timer means for measuring a rising temperature gradient of said temperature detection means at a temperature-rising stage of said baking step, and after the temperature of said temperature detection means reaches a predetermined temperature, the rate of energization of said heating means is determined in accordance with a time period measured by said timer means.

3. An automatic bread maker according to claim 2, wherein in accordance with a time period measured by said timer means, said control means determines the energization rate before the detection temperature reaches a predetermined temperature, and determines the energization rate after the detection temperature reaches a predetermined temperature.

4. An automatic bread maker according to claim 2, wherein said control means determines a predetermined temperature in accordance with a time period measured by said timer means.

5. An automatic bread maker according to claim 2, wherein the time measurement is effected by said timer means, and subsequently in accordance with a time period measured by said timer means, said control means determines a time period before the energization rate is changed.

6. An automatic bread maker according to claim 1, wherein the rate of energization of said heating means after the detection temperature of said temperature detection means reaches a predetermined temperature is determined in accordance with an amount of change of the detection temperature with the lapse of a predetermined time.

7. An automatic bread maker according to any one of claims 1 to 6, in which there is provided baking color selection means for selecting a baking color of bread, and said control means determines the rate of energization of said heating means in accordance with the baking color selected by said baking color selection means.

8. An automatic bread maker according to any one of claims 1 to 6, in which there is provided volume selection means for selecting a volume of bread, and said control means determines the rate of energization of said heating means in accordance with the volume selected by said volume selection means.

* * * * *